Dec. 30, 1969           G. LE ROY           3,486,192
APPARATUS FOR EXTRUSION OF THERMOPLASTICS
Filed March 24, 1967
FIG.I.
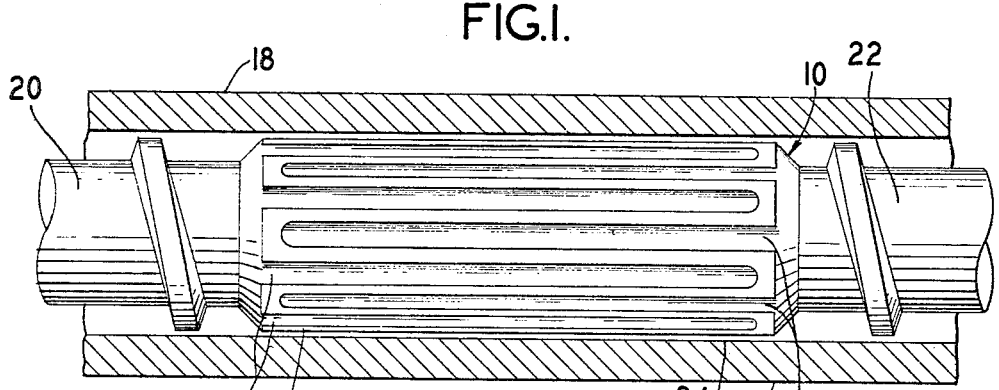
FIG.2.
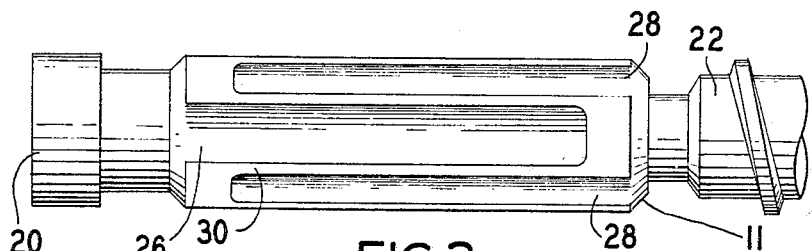
FIG.3.
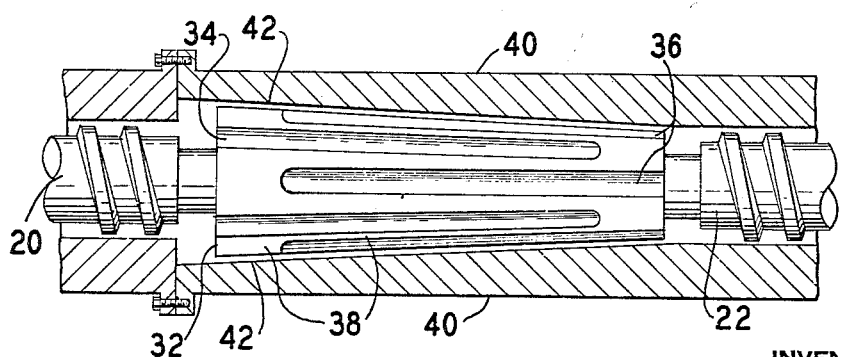
FIG.4.
INVENTOR
GENE LEROY
BY R. J. Eichelberg
ATTORNEY

United States Patent Office 3,486,192
Patented Dec. 30, 1969

3,486,192
APPARATUS FOR EXTRUSION OF THERMOPLASTICS
Gene Le Roy, Charleston, W. Va., assignor to Union Carbide Corporation, a corporation of New York
Filed Mar. 24, 1967, Ser. No. 625,706
Int. Cl. B29f 3/02
U.S. Cl. 18—12
13 Claims

ABSTRACT OF THE DISCLOSURE

It is not intended that the following abstract of the disclosure be construed as limiting the invention in any way.

The present disclosure relates to a method and apparatus for the controlled degradation of resinous thermoplastic materials which involves passing the molten plastic materials through an extrusion apparatus which has at least one special cylindrical or tapered cylindrical circumferential shearing means in the extruder screw arrangement. Input grooves are arranged extending substantially longitudinally in the surface of this special section with groove openings at the input and that terminate in dead ends before reaching the output end of the section. Output grooves arranged between the input grooves extend substantially longitudinally in the surface of the special section with openings at the output end and which terminate in dead ends before reaching the input end of the section. As the special section rotates, plastic material is fed under pressure from a prior stage into the input grooves and shears over lands between the grooves thereby shearing the plastic after which it passes into the output grooves, through the output openings and into the next conveyor stage. The circumferential shearing aperture is adjustable in the tapered cylindrical embodiment of the apparatus.

---

The present invention relates to an improvement in extrusion apparatus for resinous thermoplastic material.

One of the difficulties encountered in the manufacture of articles from the thermoplastic resins is the presence of minute resin particles of extremely high molecular weight that appear in the finished article as "fish eyes" or "gels." These "fish eyes" may be controlled to some extent during the manufacture of the resin by the adjustment of polymerization conditions or by applying shearing forces to the resin prior to forming it into an article of manufacture. The application of shearing forces usually effects some depolymerization of the fish eyes and when properly applied can also be used to reduce the molecular weight of the resin. Apparatus commonly used for this purpose comprises banbury mixers, sigma blade mixers and rotary screw type extruders. The present invention relates to an improvement in such extruders whereby thermoplastic articles of manufacture may be obtained that are substantially, if not completely, free of "fish eyes" or "gels." In another aspect of the invention a method is provided for upgrading the quality of resinous materials by depolymerization. Another feature of the invention comprises a method for converting sub-standard polyolefins, poly(alkylene oxide) and equivalents thereof into transparent films having outstanding clarity and which are free of "fish eyes" or "gels."

These and other advantages have been achieved according to the present invention which comprises novel extrusion apparatus means having at least one, cylinder or alternately a cone or a frustum of a cone having longitudinal input grooves arranged substantially longitudinally in the surface with openings at the input end that terminate in a dead end before reaching the output end, and output grooves arranged in between the input grooves and which extend substantially longitudinally in the surface with openings in the output end and which terminate in dead ends before reaching the input end. The novel extrusion apparatus means is longitudinally mounted in the barrel of an extruder and the direction of flow in the extruder characterizes both the input and output ends of the apparatus of the present invention when mounted in an extruder barrel, i.e. the input end is that end of the apparatus facing the section of the extruder barrel in which material is fed into the extruder whereas the output end is that end of the apparatus facing the section through which material exits the extruder. Although a plurality of both input and output grooves are employed in the apparatus it is also within the scope of the invention to use one input groove and one output groove.

The lands or barriers between the input and output grooves almost abut the inner wall of the extruder barrel when the apparatus of the present invention is mounted in an extruder barrel, although any clearance between the wall and lands may be used as dictated by operating conditions for the extruder.

The cone or a frustum of a cone are employed in an extruder barrel having an inner wall corresponding to the contour of the cone or frustum of a cone so that the clearance between the extruder barrel wall and the lands may be adjusted by moving the cone or frustum of a cone along its longitudinal axis. This arrangement is especially convenient for adjusting the clearance of the lands which may change due to wearing. Where the apparatus of the present invention is a cone or frustum of a cone it may be mounted in the extruder so that the tapered end is facing either the input or output section of the extruder barrel. The apparatus in a preferred embodiment is rotatably mounted in the extruder barrel.

These and other features of the invention may be further understood by reference to the drawings in which:

FIGURE 1 illustrates a cylinder having substantially longitudinal dead ending input and output grooves which may be mounted in the barrel of an extruder;

FIGURE 2 illustrates the apparatus of FIGURE 1 mounted on an extruder screw and inserted in the barrel of a screw type extruder;

FIGURE 3 illustrates the apparatus of FIGURE 1 mounted on an extruder screw where the input and output grooves of the cylinder are wider than those of FIGURE 1; and FIGURE 4 illustrates an extruder screw mounted frustum of a cone having substantially longitudinal dead ending input and output grooves.

Referring to FIGURE 1, cylinder 10, which is adapted to be mounted in the barrel of screw type extruder, contains a series of substantially longitudinal inlet grooves 12 dead ending in the outlet direction and a series of substantially longitudinal outlet grooves 14 dead ending in the inlet direction. A land 16 comprises a barrier between the input and output grooves. In a preferred embodiment cylinder 10 is rotatably mounted in a screw type extruder as partially shown in FIGURE 2 which is a section of the barrel 18 of such an extruder where inlet grooves 12 mounted so that they open in the direction of the feed end of the extruder and outlet grooves 14 open in the direction of the discharge end of the extruder. Cylinder 10 is also joined to extruder screws 20 and 22 in such a manner that the cylinder rotates with and is driven by screws 20 and/or 22. When mounted in such a fashion cylinder 10 may be placed in any section of the extruder screw although it is preferred to mount it intermediate the approximate center of the screw or in that section of the screw where molten resin prevails and the discharge end of the screw and in some instances as the discharge end of the screw. The clearance between land 16 and the inner wall 24 of extruder barrel 18 may vary.

The clearance may be readily determined by a person having ordinary skill in the art and may be broadly defined as any clearance that will give a rate of shear in the extruder commensurate with that required to remove or substantially remove "gels" or "fish eyes" from a thermoplastic resin or depolymerize such a resin.

FIGURE 3 illustrates a cylinder 11 mounted on extruder screws 20 and 22 but differs from the apparatus of FIGURE 1 in that wider inlet grooves 26 dead ending in the outlet direction and outlet grooves 28 dead ending in the inlet direction are provided with a barrier or land 30 separating grooves 28 and 26. FIGURE 4 illustrates a frustum of a cone 32 having a plurality of substantially longitudinal inlet grooves 34 dead ending in the outlet direction and outlet grooves 36 dead ending in the inlet direction, land 38 acting as a barrier for separating the groove. Extruder screws 20 and 22 are drivingly affixed to the inlet and outlet ends respectively of the frustum of a cone 32 so that said cone will rotate with said screws. A partial view of the barrel 40 of a screw extruder is also shown in FIGURE 4, the inner wall 42 of barrel 40 being tapered to receive frusto-cone 32, said cone being displaceable along its longitudinal axis so that the clearance between wall 42 and land 38 may be adjusted by longitudinally displacing the frustum cone 32.

In the grooved cylinders shown in FIGURES 1, 2 and 3 and the frustum of a cone shown in FIGURE 4, the width of the land and grooves as well as the depth of the groove may be varied to obtain maximum shear in the extruder in which they are used and can be readily determined by a person having ordinary skill in the art. The grooves may be any shapes e.g. circular, triangular or rectangular all of which are within the broad scope of the invention. The lands may also be provided with a diminishing bevel, opposite to the direction of rotation to provide a better nip to aid the shearing process.

In operating the grooved cylinder shown in FIGURE 2, a thermoplastic resin is forced into the inlet grooves 12 of cylinder 10 by rotating screw 20 in such a fashion so as to move the resin towards the openings of inlet grooves 12. Because the resin is constantly being forced into inlet grooves 12 toward the discharge end of the extruder and because grooves 12 dead end at the outlet end of the cylinder the resin moving into grooves 12 is forced across land 16 into the clearance between land 16 and extruder wall 24, down the outlet groove 14 and into the discharge end of the extruder. Because cylinder 10 is also rotating with extruder screws 20 and 22 the passage of the resin over the lands 16 and through the clearance between land 16 and wall 24 results in the development of a shearing force sufficient to substantially break down any "fish eyes" that may be in the resin and/or depolymerize it.

Thermoplastic resins that may be processed by means of the present invention comprise, polyethylene, polypropylene, polyvinyl chloride and co-polymers thereof, poly(ethyleneoxide), polyvinylidine chloride and copolymers thereof poly-4-methyl-1-pentene and the art recognized equivalents thereof.

Although the invention has been described by reference to some embodiments it is not intended that the novel apparatus be limited thereby but that certain modifications are intended to be included within the spirit and broad scope of the following claims.

What is claimed is:

1. In an extruder comprising a hollow barrel and extruder screw means to advance a thermoplastic resinous material through said barrel the improvement comprising:
   cylinder means longitudinally mounted in said barrel on said extruder screw means to shearingly engage a thremoplastic material between said cylinder and said barrel; said cylinder means comprising:
   (1) non-helical input groove means arranged to extend substantially longitudinally in the surface of said cylinder means with groove opening means at the input ends of said input grooves terminating in dead end means before reaching the output end of said cylinder;
   (2) non-helical output groove means arranged to extend substantially longitudinally in the surface of said cylinder means with groove openings at the output end of said output grooves, said output grooves terminating in dead end means before reaching the input end of said cylinder;
   (3) barrier means intermediate said grooves to prevent said grooves from directly communicating with one another and said barrier means do not contact the inner wall of said barrel.

2. In an extruder comprising a hollow barrel and extruder screw means to advance a thermoplastic resinous material through said barrel the improvement comprising:
   (a) cone means longitudinally mounted in said barrel, on said extruder screw means to shearingly engage a thermoplastic material between said cylinder and said barrel, said cone means comprising:
   (1) non-helical input groove means arranged to extend substantially longitudinally in the surface of said cone means with groove opening means at the input end of said input grooves, said input grooves terminating in dead end means before reaching the output end of said cone;
   (2) non-helical output groove means arranged to extend substantially longitudinally in the surface of said cone means with groove opening means at the output end of said output grooves, said output grooves terminating in dead end means before reaching the input end of said cone;
   (3) barrier means intermediate said grooves to prevent said grooves from directly communicating with one another and said barrier means do not contact the inner wall of said barrel.

3. The apparatus of claim 2 where said cone means comprises the frustum of a cone.

4. The apparatus of claim 2 where the inner wall of said barrel is shaped to conform to the outer dimensions of said cone means.

5. The apparatus of claim 4 where said cone means comprises the frustum of a cone.

6. The apparatus of claim 2 where said cone means is longitudinally displaceable and said barrier means comprises lands between said grooves whereby the clearance between said lands and the inner wall of said barrel is adjustable.

7. The apparatus of claim 6 where said cone means comprises the frustum of a cone.

8. In an extruder comprising a hollow barrel and extruder screw means to advance a thermoplastic resinous material through said barrel the improvement comprising:
   (1) non-helical input groove means arranged to extend substantially longitudinally in the inner surface of said extruder with groove opening means at the input ends of said input groove means, said input groove means terminating in dead end means;
   (2) non-helical output groove means arranged to extend substantially longitudinally in the inner surface of said extruder with groove opening means at the output end of said output groove means, said output groove means terminating in dead end means;
   (3) barrier means intermediate said input groove means and said output groove means to prevent said input groove means and said output groove means from directly communicating with one another;
   (4) surface means within said extruder operably co-operating with and next adjacent to both said output groove means and said input groove means for forcing thermoplastic material passing along said output groove means and said input groove means to shear across said barrier means between said output groove means and said input groove means.

9. The apparatus of claim 8 where said extruder comprises a cylindrical barrel, said input groove means and output groove means are arranged cylindrically and extend substantially longitudinally in the inner surface of said extruder and said surface means are cylindrical.

10. The apparatus of claim 8 where said extruder comprises a barrel comprising conically hollow barrel means, said input groove means and output groove means are arranged conically and extended substantially longitudinally in the inner surface of said extruder and said surface means are conical.

11. Cylinder means adapted to be longitudinally mounted on an extruder screw means to shearingly engage a thermoplastic material between said cylinder and the barrel of an extruder comprising:
  (1) non-helical input groove means arranged to extend substantially longitudinally in the surface of said cylinder means with groove opening means at the input end of said input groove means, said input groove means terminating in dead end means before reaching the output end of said cylinder;
  (2) non-helical output groove means arranged to extend substantially longitudinally in the surface of said cylinder means with groove opening means at the output end of said output groove means, said output groove means terminating in dead end means before reaching the input end of said cylinder;
  (3) barrier means intermediate said input groove means and said output groove means to prevent said input groove means and said output groove means from directly communicating with one another.

12. Conical means adapted to be longitudinally mounted on an extruder screw means to shearingly engage a thermoplastic material between said conical means and the barrel of an extruder comprising:
  (1) non-helical input groove means arranged to extend substantially longitudinally in the surface of said conical means with groove opening means at the input end of said input groove means, said input groove means terminating in dead end means before reaching the output end of said conical means;
  (2) non-helical output groove means arranged to extend substantially longitudinally in the surface of said conical means with groove opening means at the output end of said output groove means, said output groove means terminating in dead end means before reaching the input end of said conical means;
  (3) barrier means intermediate said input groove means and said output groove means to prevent said input groove means and said output groove means from directly communicating with one another.

13. The apparatus of claim 12 where said conical means comprise frusto-conical means.

References Cited

UNITED STATES PATENTS

| | | |
|---|---|---|
| 2,970,341 | 2/1961 | Mallory et al. |
| 3,239,883 | 3/1966 | Ferrari. |
| 3,271,819 | 9/1966 | Lacher. |
| 3,375,549 | 2/1968 | Geyer. |

WILLIAM J. STEPHENSON, Primay Examiner